Feb. 21, 1961     D. J. BERNARDI     2,972,302
METHOD OF TYPOGRAPHIC PRINTING
Filed Nov. 25, 1955
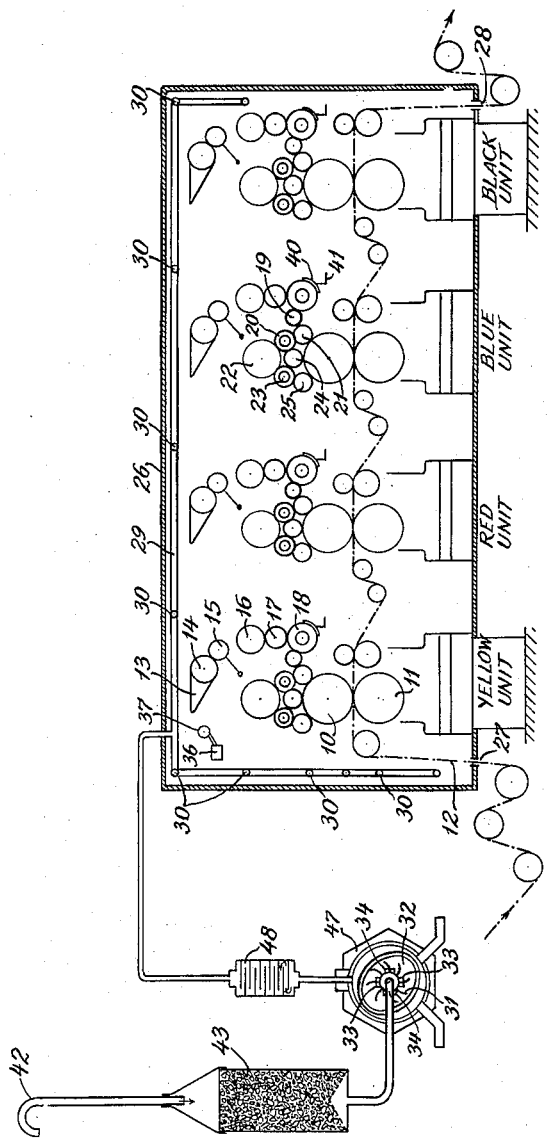
INVENTOR.
*Dominic J. Bernardi*

United States Patent Office 2,972,302
Patented Feb. 21, 1961

---

2,972,302

METHOD OF TYPOGRAPHIC PRINTING

Dominic J. Bernardi, Scarsdale, N.Y., assignor to Interchemical Corporation, New York, N.Y., a corporation of Ohio Filed Nov. 25, 1955, Ser. No. 549,203

4 Claims. (Cl. 101—426)

This invention relates to the art of typographic printing with inks which dry by absorption of moisture, and aims to make possible high speed web printing with inks of this general type while at the same time ensuring good printing quality.

Moisture setting inks were introduced into the trade in the late thirties, and have attained wide popularity in the printing of packages, particularly for food stuffs. These inks are dispersions of pigments in vehicles consisting of (a) a water-miscible hygroscopic solvent and (b) a resin which is soluble in the solvent, but which is precipitated out when sufficient water is absorbed by the solvent. The inks dry by absorbing water from the stock, the air or from steam or water directed at the printed surface; the water absorbed by the ink separates the resin from the solvent-water combination, which is rapidly absorbed by the stock. Such inks set much more rapidly than conventional linseed oil inks, and they can be formulated to be substantially non-odorous—hence their desirability for printing food packages.

Certain difficulties are encountered in printing moisture setting inks on conventional typographic presses, with their extended distribution systems. With differences in ordinary ambient conditions, an ink which distributes and prints one day will not do so another day when the relative humidity is substantially higher. It has been necessary, in order to produce satisfactory inks, to build in resistance to the higher humidities encountered. This in turn slows up the ink dry. Even inks formulated for the lowest normal humidity ranges (to be printable up to 65% relative humidity) will not dry sufficiently fast enough in multiple films to permit web printing in excess of about 300 to 400 feet per minute, unless back waxing or spraying of the web to prevent offset is resorted to. And for most printing plants, inks must be formulated to be printable up to 80 to 90% relative humidity, so that they cannot be dried at speeds in excess of about 200 feet per minute. Furthermore, because these inks will often not print fine half-tones at higher humidities, it has been found desirable to abstain from excessive detail on plates used for printing ordinary moisture setting inks.

Inks based on glycols also have certain advantages when designed to be dried by heat alone, and are used to some extent in the high speed printing of publications. But such inks have had to be formulated to be substantially insensitive to moisture, in order to ensure proper printability, and hence are essentially heat drying inks, making no use of the moisture precipitation principle in their drying.

It would obviously be advantageous to maintain the press-room at relatively low constant humidity, so that inks would not be subjected to the vagaries of ambient humidity changes. But the cost of controlled dehumidification is so high as to outweight the advantages. Furthermore, if the press-room is maintained at a relatively low relative humidity, the paper kept there tends to dry out, and this causes later difficulties in printing and processing.

I have discovered how to both improve printability and increase the drying speed of moisture setting inks in press rooms where the ambient humidity varies over wide limits. In accordance with my invention, I maintain about the distribution system of a typographic press with an extended distribution system, a body of air with a relative humidity below the relative humidity of the press room in general, and in no event above 50%. If desired, the air may be additionally saturated with sufficient solvent vapor to retard evaporation of ink solvent, as disclosed in the Gessler et al. application Serial No. 421,242, filed April 6, 1954, to permit the use of a very volatile glycol, and the printed web passed into a heater, preferably charged with super-heated steam, to dry the web rapidly.

I have furthermore discovered that if inks are used in my method which are not printable at relative humidities above the 50–55% range at 75° F., then the prints can be dried at press speeds of 1000 feet per minute and higher in an ordinary super-heated steam drier, with the surprising result of a three fold or greater increase in speed over conventional practice, as compared with a rather small change in the humidity range at which the inks are printable.

The invention can best be understood by reference to the drawing, which shows schematically a four color press equipped for the practice of my invention.

The press comprises 4 separate units of substantially identical design, identified in the drawing by the color which is ordinarily printed by the unit. Each unit consists of a printing cylinder 10 having a printing plate mounted on it, and an impression cylinder 11. A web 12 of paper is fed through the press by appropriate rollers, preferably passing after printing into a conventional super heated steam drier to set the ink by a combination of moisture and heat.

Each plate is inked by a distributing system which comprises a series of rollers operating between the fountain 13 and the plate. The metal fountain roller 14 takes ink from the fountain, and transfers it to a rubber ductor roller 15, to a metal roller 16, to a rubber roller 17, thence to the oscillating metal ink storage roller 18 which can be water cooled. A rubber idler roller 19, takes the ink to the final stages of the distributing system, contacting the form roller 21 which inks the plate and contacts the metal roller 20; roller 20 is in contact with distributing roller 22 and form roller 24; the water cooled metal roller 23 inks both the form rollers 24 and 25.

The entire press structure is surrounded by an enclosure 26, preferably of some material such as glass, "Lucite," or other transparent material; this enclosure is complete except for a slit 27 through which the web enters the enclosure, and a slit 28 through which the web leaves the enclosure. The enclosure is provided with appropriate hatches and doors so that, for example, a pressman can get at any fountain from the top of the press, or so that the press can be entered from the side for the purpose of changing plates and so on.

Air is run into the enclosure through a manifold 29, having ports 30 distributed about the enclosure so that dilution with fresh air, brought in by the web 12, is kept at a minimum. The air is drawn from an inlet pipe 42 through a column 43 of desiccant (for example, a five foot column packed with anhydrous calcium chloride briquettes and flakes) through a blower 47 and a baffle chamber 48 into the manifold 29.

The blower 47 can be an ordinary blower; but if it is desired to use dry air contained ink solvent vapor, it may be a liquid sealed compressor consisting of a vaned rotor 31, operating in a liquid seal 32 of solvent. To pass from the inlet ports 33 to the outlet ports 34, the dry air fed into the compressor must pass through the liquid solvent, and thus it becomes substantially completely saturated with solvent vapor at the temperature and pressure in the compressor chamber.

For operation with systems which use solvent-saturated dehydrated air, means must be provided for determining the dew point of the solvent in the enclosure. For example, a water cooled etched or ground mirror 36, with a temperature indicator 37, can be observed. As soon as its reflectivity increases on account of condensed vapor, the mirror loses its frosted appearance and the dew point temperature can then be read off on the temperature indicator. Most preferably, a photo-electric system for indicating the first increase in reflectivity (the dew point) is used in combination with a resistance thermometer or a sensitive thermocouple, attached to the surface of the mirror. All readings can be made on instruments outside the enclosure.

I also provide temperature measuring devices 40 at one or more strategic points in the distributing system. These are connected, by electrical leads, to registering devices outside of the press enclosure where the temperature can be read accurately. The registering devices are also, preferably, connected to controls which automatically keep the temperature of the rollers within a predetermined range. As shown in the drawings, these devices 40 may be mounted on the large oscillated water cooled roller 18, known in this particular distributing system as the ink storage roller.

Because I use dried air, it is possible to control the necessary relationship of solvent concentration in the special atmosphere to the vapor pressure of the solvent in the inks being distributed by cooling the rollers, without running the risk that water will be precipitated out of the air onto the rollers.

In the practice of my invention, I have used conventional water setting inks. These inks comprise pigments dispersed in varnishes which are solution of resins in glycols and/or polyglycols, using resins with high water-tolerance, e.g. unesterified rosin maleic acid adducts. Such links are generally printable, without any addants, up to about 65 to 70% relative humidity at 75° F. In conventional practice, these inks are formulated with addants—such as triethanolamine, or other materials to give more water tolerance—so as to be printable up to 80 to 90% relative humidity at 75° F., depending on climatic conditions. The addants used affect the drying rate, cause some pigments to change color, and may adversely affect film properties. By using my invention, it is possible to use conventional maleated-rosin glycol inks without any addants, without regard to ambient conditions.

By using the combination of dried air saturated with solvent vapor, it is possible to use the conventional maleated-rosin vehicles in glycols which evaporate relatively rapidly, such as ethylene and propylene glycols. A substantial increase in drying rate is possible by this technique, with a super heated steam drier. Speeds of 500 to 600 feet per minute are obtainable with such driers. The same inks, passed through high temperature direct heat or direct heat plus drum driers (such as are used for publication printing) can be dried at speeds of the order of 1200 to 1500 feet per minute; unfortunately, however, the paper is sufficiently weakened in the drying process to cause substantial difficulties.

I have discovered that it is possible to produce inks which, when printed in dried air alone, according to the present invention, can be dried at speeds up to 1000 feet per minute with ordinary superheated steam driers. Such inks are disclosed and claimed in my copending patent application Serial No. 549,202, filed November 25, 1955. These inks are not printable beyond 50 to 55% relative humidity at 75° F. A typical satisfactory set of four color inks can be made as follows:

EXAMPLE 1.—VARNISH

|  | Parts by weight |
|---|---|
| Amberol 750 (partial glycerol ester of maleated rosin) | 47.3 |
| Diethylene glycol | 52.7 |

The resin is melted, and dissolved in the solvent.

EXAMPLE 2.—FOUR COLOR SET OF INKS

*First down*

YELLOW INK OF 4 COLOR SET

|  | Parts by weight |
|---|---|
| Varnish of Example 1 | 35.7 |
| Diethylene glycol | 9.4 |
| Primrose chrome yellow | 37.9 |
| Medium chrome yellow | 8.8 |
| Clay | 8.2 |

This ink was of fairly heavy body, measuring 19.4 on an inkometer run at 1200 r.p.m.

*Second down*

RED INK OF SET

|  | Parts by weight |
|---|---|
| Varnish of Example 1 | 60.2 |
| Diethylene glycol | 17.1 |
| Lithol red | 9.5 |
| Clay | 1.9 |
| Watchung red | 11.3 |

This ink measured 16.8 on the inkometer.

*Third down*

BLUE INK OF SET

|  | Parts by weight |
|---|---|
| Varnish of Example 1 | 56.0 |
| Diethylene glycol | 14.7 |
| Clay | 23.4 |
| Bronze blue | 5.0 |
| Victoria blue | 0.9 |

This ink measured 12.0 on the inkometer.

*Fourth down*

BLACK INK OF SET

|  | Parts by weight |
|---|---|
| Varnish of Example 1 | 61.3 |
| Diethylene glycol | 22.6 |
| Carbon black | 12.0 |
| Bronze blue | 4.1 |

This ink measured 7.8 on the inkometer.

While these inks have other advantages than drying speeds, as compared with conventional moisture setting inks, they make possible for the first time the attainment of very high press speeds in the typographic printing of food packages, such as bread wrappers and the like.

It is interesting to note that these inks, formulated with relatively non-volatile polyglycols and water-sensitive resins, can be dried on super-heated steam driers at speeds of the order of 1000 feet per minute in multiple films whereas inks made from conventional resins used in moisture setting inks, with the volatile simple glycols, can only be dried in similar multiple films at speeds of the order of 600 feet per minute.

I have found that when inks are used made of these water-sensitive resins dissolved in fast evaporating simple glycols (e.g. propylene glycol), and the distribution system is blanketed with dried air saturated with solvent vapor, speeds of 1500 feet per minute are attainable in multiple films with a superheated steam drier. The resultant printed web is characterized by much better physical properties, particularly strength, than paper dried at similar speeds through conventional gas, or gas and drum driers, where dry heat is used.

While I have shown my invention as applied to a four color web of one design, the method is applicable to other presses, including flat-bed presses, sheet fed rotary presses, multi color presses with single impression cylinders and the like, since any of these presses can be blanketed in a body of dried air. It is only necessary to fit the blanketing procedure to the particular press.

For most printing, it will be obvious that the dried air treatment alone will provide all that is necessary, in combination with my new inks, to give sufficiently high press speeds. However, the combination of dried air with saturation with solvent vapor, makes possible improvements in present day techniques in high speed publication printing.

I claim:

1. The method of web printing at speeds substantially in excess of 400 feet per minute on a typographic press with an extended distribution system, with inks which can be set by the addition of moisture thereto, which comprises printing on a web at such speeds with inks which are unprintable on the press at ordinary ambient relative humidities above about 55%, while maintaining about the distribution system of the press a body of air at a relative humidity less than that of the balance of the press room and not above 50%, and thereafter exposing the web to superheated steam outside the body of air.

2. The method of web printing at speeds of the order of 1000 feet per minute or more on a typographic press with an extended distribution system with inks which can be set by the addition of moisture thereto and which are unprintable on the press by reason of their containing solvents which are so volatile that the inks dry on the press and which in any event are unprintable at ambient relative humidities in excess of 55%, which comprises printing at such speeds with such inks while maintaining about the distribution system of the press a body of air at a relative humidity not above 50% and containing a sufficient concentration of ink solvent vapor to retard evaporation of the ink solvent, and thereafter exposing the web to superheated steam outside the body of air.

3. The method of high speed printing on a typographic press with an extended distribution system with inks which can be set with the addition of moisture thereto, which comprises printing at a speed substantially in excess of 400 feet per minute with inks which are unprintable on the press at ordinary ambient relative humidities above 55% while maintaining about the distribution system of the press a body of air at a relative humidity less than that of the balance of the pressroom and not above 50%, and thereafter drying the printed ink at said speed by adding moisture thereto outside the body of air.

4. The method of high speed printing on a typographic press with an extended distribution system with inks which can be set with the addition of moisture thereto, which comprises printing at a speed substantially in excess of 400 feet per minute with inks which are unprintable on the press at ordinary ambient relative humidities above 55% while maintaining about the distribution system of the press, a body of air at a relative humidity not above 50%, and thereafter drying the printed ink by adding moisture thereto outside of body of dry air.

References Cited in the file of this patent

UNITED STATES PATENTS

| | | |
|---|---|---|
| 643,372 | Cornwall | Feb. 13, 1900 |
| 1,805,144 | Jones | May 12, 1931 |
| 1,827,530 | Le Grand | Oct. 13, 1931 |
| 2,063,636 | Stevens et al. | Dec. 8, 1936 |
| 2,063,672 | Goddard | Dec. 8, 1936 |
| 2,272,406 | Gurwick | Feb. 10, 1942 |
| 2,298,803 | Morris | Oct. 13, 1942 |
| 2,319,853 | Durham | May 25, 1943 |
| 2,395,151 | Sodamka | Feb. 19, 1946 |
| 2,556,262 | Faeber | June 21, 1951 |
| 2,574,900 | Williams et al. | Nov. 13, 1951 |
| 2,821,133 | Brodie | Jan. 28, 1958 |
| 2,854,924 | Ault et al. | Oct. 7, 1958 |

OTHER REFERENCES

Ellis: Printing Inks, 1940, Reinhold Pub. Co., N.Y.; only pages 475 and 476 made of record. (Copy available in Div. 17.)